United States Patent
Isono

(10) Patent No.: US 10,351,117 B2
(45) Date of Patent: Jul. 16, 2019

(54) BRAKE UNIT

(71) Applicant: TOYOTA JIDOSHA KABUSHIKI KAISHA, Toyota-shi, Aichi (JP)

(72) Inventor: Hiroshi Isono, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 44 days.

(21) Appl. No.: 15/873,513

(22) Filed: Jan. 17, 2018

(65) Prior Publication Data

US 2018/0215368 A1    Aug. 2, 2018

(30) Foreign Application Priority Data

Jan. 27, 2017    (JP) .................................. 2017-013282

(51) Int. Cl.

| F16D 55/08 | (2006.01) |
|---|---|
| B60T 13/74 | (2006.01) |
| B60T 8/34 | (2006.01) |
| B60T 13/66 | (2006.01) |
| B60T 8/32 | (2006.01) |
| B60T 1/06 | (2006.01) |

(Continued)

(52) U.S. Cl.
CPC ............ *B60T 13/741* (2013.01); *B60T 1/062* (2013.01); *B60T 7/042* (2013.01); *B60T 8/3255* (2013.01); *B60T 8/345* (2013.01); *B60T 13/667* (2013.01); *B60T 13/748* (2013.01); *B60T 17/22* (2013.01); *B60T 8/321* (2013.01); *B60T 2270/402* (2013.01)

(58) Field of Classification Search
CPC ...... B60T 13/741; B60T 13/748; B60T 17/99; B60T 2270/402; B60T 8/321

USPC ................. 701/48, 70, 76; 303/167
See application file for complete search history.

(56) References Cited

U.S. PATENT DOCUMENTS

| 8,177,037 B2* | 5/2012 | Kim ..................... B60T 8/345 188/72.2 |
| 8,185,288 B2* | 5/2012 | Strengert ............. B60T 17/221 188/162 |

(Continued)

FOREIGN PATENT DOCUMENTS

| JP | 2004-351965 A | 12/2004 |
| JP | 2008-236996 A | 10/2008 |

(Continued)

OTHER PUBLICATIONS

Modeling and Control of a Four Wheel Drive Parallel Hybrid ElectricVehicle; Ali Boyali et al.; 2006 IEEE Conf on Computer Aided Control System Design, 2006 IEEE Inter Conf on Control Applications; pp. 155-162; 2006 IEEE Inter Symposium on Intelligent Control. (Year: 2006).*

*Primary Examiner* — Cuong H Nguyen
(74) *Attorney, Agent, or Firm* — Oliff PLC

(57) ABSTRACT

A brake unit that allows the vehicle to evacuate safely in the event of brake failure while maintaining a braking performance. The brake unit is mounted on a vehicle together with a motor drive unit 2 to control brake force in accordance with a stroke of a brake pedal and a pedal force. Each brake system comprises: a stroke sensor; a pedal force sensor; a brake mechanism applying brake force to a driveshaft; a controller controlling the brake mechanism based on the stroke and the pedal force; and a powersource supplying electricity to the brake mechanism and the controller. The first controller 13 and the second controller support each other to control brake force.

6 Claims, 7 Drawing Sheets

(51) Int. Cl.
  *B60T 7/04*   (2006.01)
  *B60T 17/22*  (2006.01)

(56) References Cited

U.S. PATENT DOCUMENTS

| | | | |
|---|---|---|---|
| 2004/0256911 A1* | 12/2004 | Hatano | B60T 8/267 |
| | | | 303/3 |
| 2010/0147633 A1* | 6/2010 | Kim | B60T 8/345 |
| | | | 188/72.7 |
| 2010/0198473 A1* | 8/2010 | Strengert | B60T 17/221 |
| | | | 701/70 |
| 2016/0068159 A1 | 3/2016 | Zou | |
| 2016/0153537 A1 | 6/2016 | Kubo et al. | |
| 2017/0130788 A1 | 5/2017 | Noguchi et al. | |

FOREIGN PATENT DOCUMENTS

| | | |
|---|---|---|
| JP | 2010-137848 A | 6/2010 |
| JP | 2015-194165 A | 11/2015 |
| JP | 2016-059269 A | 4/2016 |
| WO | 2015/008661 A1 | 1/2015 |

* cited by examiner

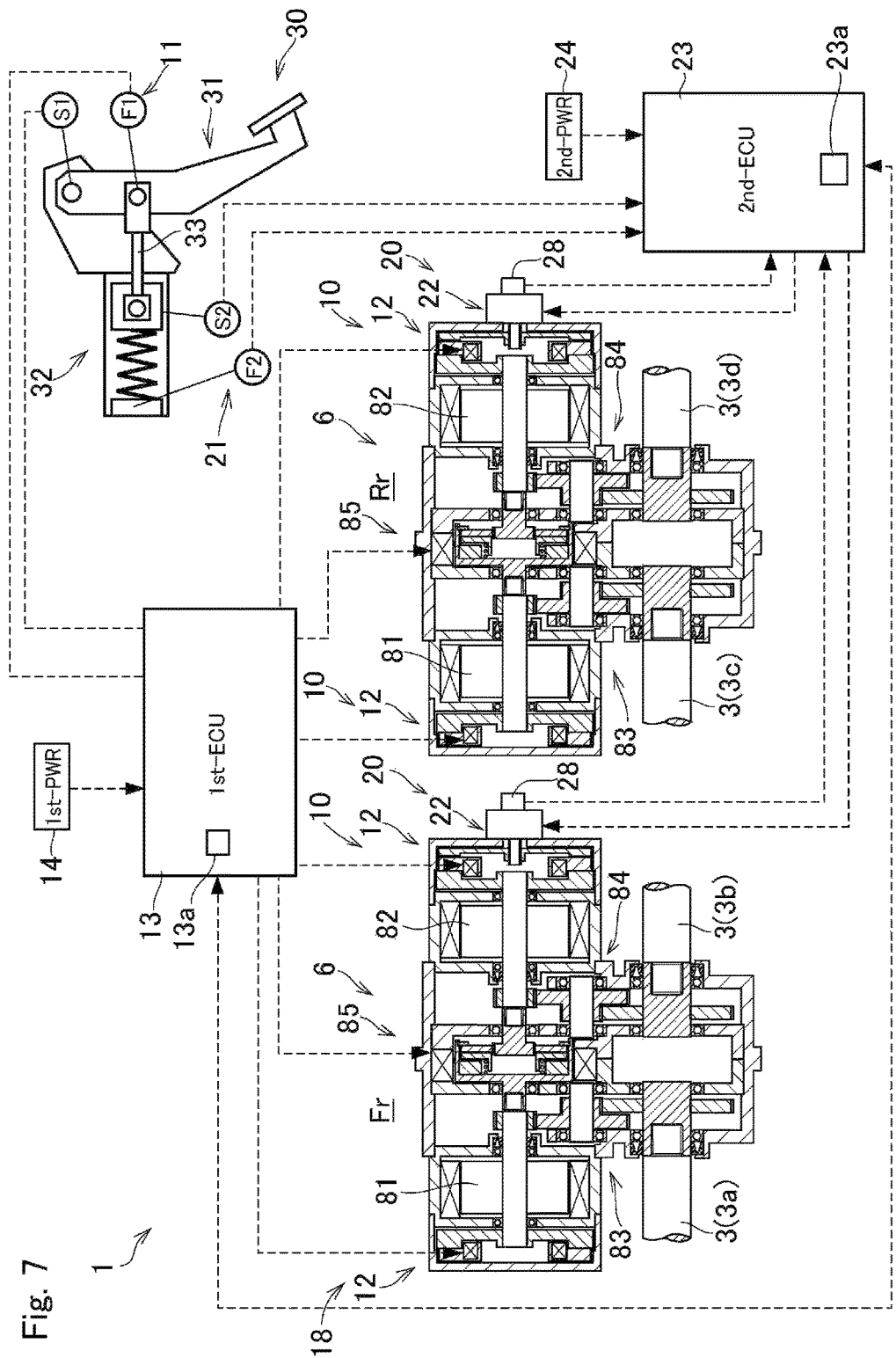

BRAKE UNIT

CROSS REFERENCE TO RELATED APPLICATIONS

The present disclosure claims the benefit of Japanese Patent Application No. 2017-013282 filed on Jan. 27, 2017 with the Japanese Patent Office, the disclosure of which are incorporated herein by reference in its entirety.

BACKGROUND

Field of the Disclosure

Embodiments of the present application relate generally to the art of a brake unit that establishes a brake force in accordance with a stroke of a brake pedal, and especially to an electric brake unit mounted on a vehicle together with a drive unit including a drive motor serving as a prime mover

Discussion of the Related Art

US 2004/256911 A1 and US 2010/147633 A1 describe examples of a brake device used in automobiles. The braking device taught by US 2004/256911 A1 includes a hydraulic brake and an electric brake according to the teachings of US 2004/256911 A1, in the event of failure of the electric system, the function of the hydraulic brake is kept to be normal. By contrast, in the event of failure of the hydraulic system, the function of the electric brake is kept to be normal.

US 2010/147633 A1 describes a brake system comprising a main brake driven by a motor, and a sub-brake actuated by a solenoid. According to the teachings of US 2010/147633 A1, the main brake and the sub-brake are adapted to lock a common wheel disc, and the sub-brake is isolated away from the main brake. The main brake is controlled by a controller to lock the wheel disc in accordance with a position of a brake pedal. In the event of failure of the main brake, the sub-brake is actuated to lock the wheel disc by a command signal sent from the controller that also controls the main brake.

US 2017/130788 A1 describes an opposed-piston type disk brake device in which a parking brake is integrally arranged in a caliper of a service brake. According to the teachings of US 2017/130788 A1 the caliper is fixed to a suspension device while straddling over a rotor that is rotatable together with a wheel. The service brake is actuated hydraulically to stop a rotation of the rotor; and the parking brake is actuated by a motor to stop the rotation of the rotor.

PCT international publication WO 2015/008661 describes one example of a motor drive unit. The drive gear unit taught by WO 2015/008661 as a torque vectoring device comprises a differential mechanism for distributing torque delivered from a drive motor to right and left drive wheels, and a differential motor for controlling a torque split ratio to the drive wheels. The differential unit comprises a pair of single-pinion planetary gear units; and sun gears of the planetary gear units are connected to both ends of a rotary shaft. An input gear is fitted onto an intermediate portion of the rotary shaft, and torque of the drive motor is applied to the input gear (in FIG. 1). WO 2015/008661 further discloses a drive motor using the rotary shaft as a rotor in FIG. 7. Ring gears of the planetary gear units are connected to each other through a torque reversing device so that the ring gears are rotated in opposite directions. The differential motor s connected to one of the ring gears, and drive wheels are connected to carriers of the planetary gear units.

US 2016/068159 A1 also describes a vehicle driving system comprising a first motor, a second motor, and a clutching mechanism that connects rotary shafts of the motors. According to the teachings of US 2016/068159 A1, a first rotary shaft of the first motor is connected to a left drive wheel, and a second rotary shaft of the second motor is connected to a right drive wheel. The clutching mechanism is disposed between the first rotary shaft of the first motor and the second rotary shaft of the second motor.

JP-A-2008-236996 A1 describes a motor provided with an electromagnetic brake. According to the teaching of JP-A-2008-236996, a brake rotor of the electromagnetic brake is fixed to one end of a motor shaft (i.e., an output shaft of the motor). The brake rotor is brought into frictional engagement with a brake stator by aspirating an armature to halt the motor shaft.

Both of the braking device taught by US 2004/256911 A1 and the brake system taught by US 2010/147633 A1 comprise the main brake system and the backup brake system. For this reason, a reliability of the brake system can be improved, and a vehicle is allowed to evacuate even if a failure occurs on one of the brake systems.

A ratio between drive forces of the right and the left wheels can be controlled by the torque vectoring device taught by WO 2015/008661 or the vehicle driving system taught by US 2016/068159 A1 depending on a running condition, and consequently a turning stability, a turning performance, a running stability etc. of the vehicle can be improved. In addition, a hydraulic system and a reinforce member such as a brake caliper may be omitted by mounting the motor having the electromagnetic brake taught by JP-A-2008-236996 A1 on the vehicle. Consequently, a structure of the brake system can be simplified and a weight of the vehicle can be reduced. Further, the motor drive unit of this kind may serve as an inboard brake. In this case, an unsprung load of the vehicle may be reduced.

However, a redundant system to increase reliability of the brake system mounted on automobiles together with the motor drive unit is not available in the prior art. According to the safety standard, a main brake system, a secondary brake system, and a parking brake must be arranged in vehicles. Specifically, the secondary brake system is configured to stop the vehicle within a safety distance in the event of failure of the main brake system that is operated manually by a driver. For this reason, in the event of failure of the main brake, the conventional vehicle is allowed to evacuate to a safety site while using the secondary brake system. However, according to the teachings of US 2004/256911 A1 and US 2010/147633 A1, different kinds of brake systems such as the hydraulic brake and the electric brake are used as the main brake system and the sub brake system. For this reason, if a failure occurs on the hydraulic brake, for example, a brake feel may be changed. In addition, according to the teachings of US 2010/147633 A1, the main brake system and the sub-brake system are controlled by the common controller. For this reason, the brake systems of US 2010/147633 A1 may not be controlled when a failure occurs on the controller.

Thus, the redundant system to increase reliability of the conventional brake system has to be improved to allow the vehicle to evacuate safely in the event of failure of the brake system, while maintaining a braking performance without changing a brake feel.

SUMMARY

Aspects of the present disclosure have been conceived noting the foregoing technical problems, and it is therefore an object of the present disclosure is to provide a brake unit mounted on a vehicle together with a motor drive unit, that allows the vehicle to evacuate safely in the event of failure of the brake system, while maintaining a braking performance without changing a brake feel. In the embodiment of the present disclosure, an electric brake includes an electromagnetic brake actuated by a magnetic attraction, and an electric brake actuated by a motor torque.

The present disclosure relates to a brake unit, that is mounted on a vehicle together with a motor drive unit including a drive motor that generates a drive torque to establish a drive force of the vehicle, and a power transmission mechanism that delivers the drive torque to a driveshaft. The brake unit controls a brake force applied to the vehicle in accordance with a stroke of a brake pedal and a pedal force applied to the brake pedal. In order to achieve the above-explained objective, according to the embodiment of the present disclosure, the brake unit is provided with a first brake system and a second brake system. The first brake system comprises: a first sensor that detects a stroke of the brake pedal and the pedal force applied to the brake pedal; a first brake mechanism that is actuated by an electric energy to apply a frictional brake force to the driveshaft; a first controller that controls the first brake mechanism based on the stroke and the pedal force detected by the first sensor; and a first power source that supplies electricity to the first brake mechanism and the first controller. On the other hand, the second brake system comprises: a second sensor that detects a stroke of the brake pedal and the pedal force applied to the brake pedal; a second brake mechanism that is actuated by an electric energy to apply a frictional brake force to the driveshaft; a second controller that controls the second brake mechanism based on the stroke and the pedal force detected by the second sensor; and a second power source that supplies electricity to the second brake mechanism and the second controller. The first controller comprises a first communication device that transmits and receives a signal to/from the other controller, and the second controller comprises a second communication device that transmits and receives a signal to/from the other controller. In addition, the first communication device and the second communication device are connected to each other, and the first controller and the second controller support each other to control the brake force.

In a non-limiting embodiment, the first brake mechanism may include an electromagnetic brake that is actuated to establishes magnetic attraction when energized, and the second brake mechanism may include an electric brake that is actuated by an output torque of a brake motor that is energized to generate the torque.

In a non-limiting embodiment, the second brake mechanism may comprises a thrust force generating mechanism that converts rotary motion into linear motion to generate a thrust force to halt the driveshaft and that keeps stopping a rotation of the driveshaft. The thrust force generating mechanism may be actuated by the output torque of the brake motor to apply the frictional brake force to the driveshaft. In addition, the second brake system may serve as a parking brake that keeps the driveshaft stopping after halting any one of pairs of the driveshafts connected to front wheels or rear wheels and stopping current supply to the second brake mechanism.

In a non-limiting embodiment, the first brake mechanism and the second brake mechanism may be mounted on the vehicle to individually serve as an inboard brake to halt each pair of the front wheels and the rear wheels.

In a non-limiting embodiment, the brake unit may further comprise: a reaction force generating mechanism that generates a reaction force against the pedal force applied to the brake pedal in accordance with a stroke of the brake pedal; and a transmission member that transmit the pedal force between the brake pedal and the reaction force generating mechanism. Specifically, the brake pedal may comprise a pivot point at which the brake pedal is connected to a vehicle body in a pivotal manner, and an output member that transmits the pedal force applied to the brake pedal to the transmission member. The reaction force generating mechanism may comprise an elastic member that is elastically compressed by the pedal force, an input member that transmits the pedal force transmitted from the transmission member to the elastic member, and a stationary member that receives a reaction force established when the elastic member is compressed. The first sensor may comprise a first stroke sensor that is arranged in the pivot point to detect the stroke of the brake pedal, and a first pedal force sensor that is arranged in the output member to detect the pedal force applied to the brake pedal. The second sensor may comprise a second stroke sensor that is arranged in the input member to detect the stroke of the brake pedal, and a second pedal force sensor that is arranged in the stationary member to detect the pedal force applied to the brake pedal. The first brake system may be adapted to control the brake force based on the stroke detected by the first stroke sensor and the pedal force detected by the first pedal force sensor. The second brake system may be adapted to control the brake force based on the stroke detected by the second stroke sensor and the pedal force detected by the second pedal force sensor.

In a non-limiting embodiment, in the event of failure of the first brake system, the second brake system may control the brake force. Instead, a counterpart of a faulty component in the second brake system may function instead of a faulty component of the first brake system to control the brake force.

Thus, according to the embodiment of the present disclosure, the first brake system and the second brake system are arranged separately. In addition, the controllers of the first brake system and the second brake system are connected to each other to allow the first brake system and the second brake system to support each other. According to the embodiment of the present disclosure, therefore, the brake force applied to the vehicle may be controlled by the second brake system as a redundant (or sub) brake system in the event of failure of the first brake system as a main brake system. For this reason, a reliability of the brake unit may be improved.

As described, the electromagnetic brake is employed as the first brake system and the electric brake is employed as the second brake mechanism. According to the embodiment, therefore, the brake force can be controlled electrically and mechanically in accordance with a stroke and a pedal force of the brake pedal, without relying on a hydraulic system. For this reason, accuracy and response of the brake force applied to the vehicle can be improved. In addition, the brake unit may be controlled properly while maintaining a braking performance without changing a brake feel, during controlling the brake force by the second brake system in the event of failure of the first brake system, so as to allow the vehicle to evacuate.

Moreover, the second brake system may serve as a parking brake. According to the embodiment, therefore, the first brake system and the second brake system may serve as the main brake system, the sub-brake system, and the parking brake to satisfy the safety standard.

Further, any one of the brake system of the front side and the rear side may be mounted on the vehicle to serve as an inboard brake. According to the embodiment, therefore, an unsprung load of the vehicle may be reduced in comparison with that in the conventional vehicle in which the brake device is attached to the wheel.

Furthermore, the first sensor comprises the first stroke sensor and the first pedal force sensor, and the second sensor comprises the second stroke sensor and the second pedal force sensor. Those sensors are arranged in different portions of the brake pedal and the reaction force generating mechanism. According to the embodiment, therefore, two different brake sensors may be formed by the stroke sensors and the pedal force sensors. For this reason, a reliability of the brake unit may be improved. In addition, the stroke and the pedal force of the brake pedal may be detected by the sensor functioning properly even if a failure occurs on any of the sensors.

In addition, in the event of failure of the first brake system, the second brake system may control the brake force instead of first brake system entirely or partially. According to the embodiment, therefore, reliability of not only the brake unit but also the vehicle may be improved. Further, the brake unit according to the embodiment of the present disclosure may be mounted on an autonomous vehicle. In this case, an operating mode of the autonomous vehicle may be shifted promptly from an autonomous mode to a manual mode in the event of failure during autonomous operation. For this reason, the reliability of the autonomous vehicle may also be improved.

BRIEF DESCRIPTION OF THE DRAWINGS

Features, aspects, and advantages of exemplary embodiments of the present disclosure will become better understood with reference to the following description and accompanying drawings, which should not limit the invention in any way.

FIG. 7 is a schematic illustration showing a structure of the brake unit and the motor drive unit according to a fourth example.

DETAILED DESCRIPTION OF THE PREFERRED EMBODIMENT(S)

Figure 1:
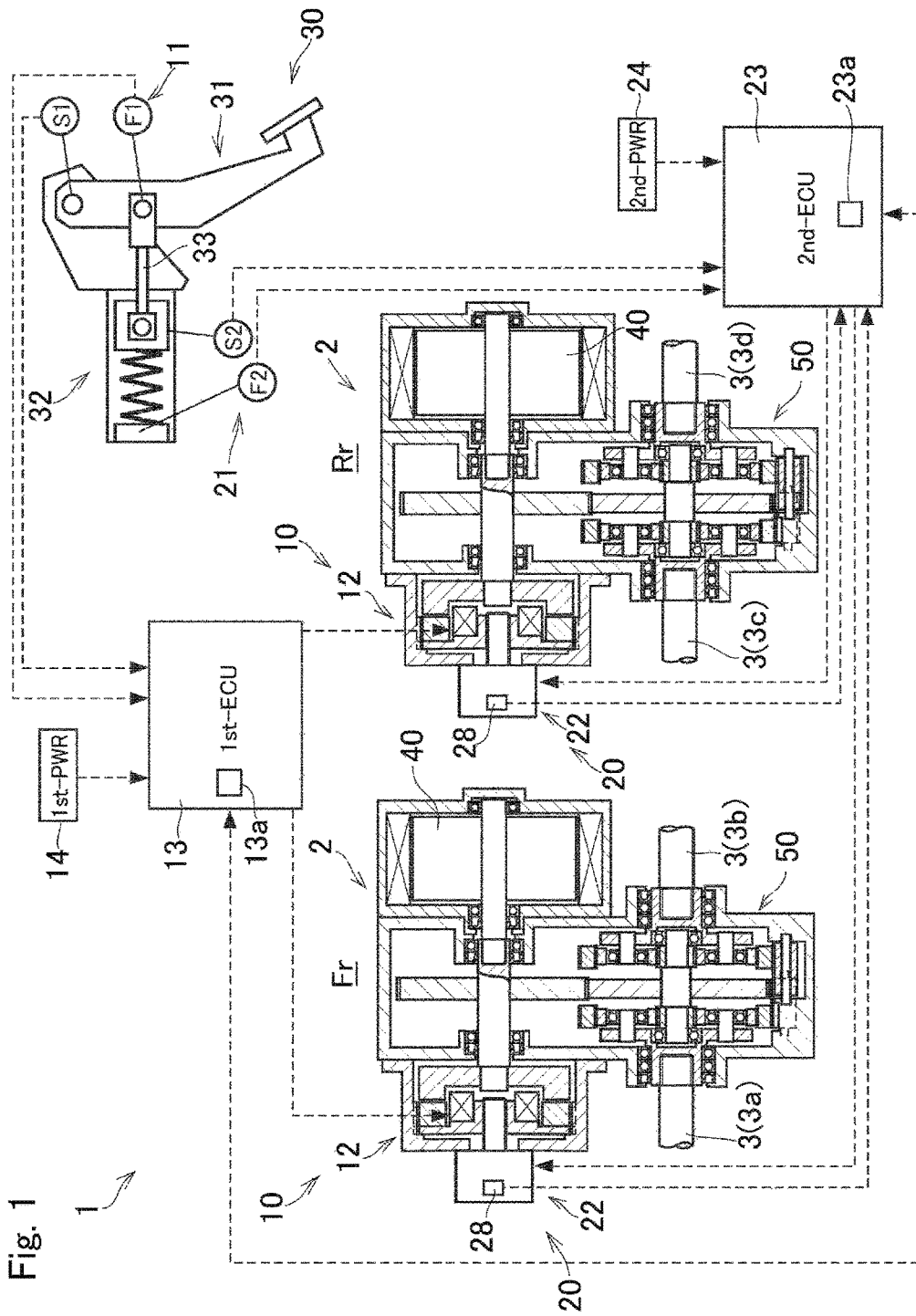
FIG. 1 is a schematic illustration showing one example of a structure of the brake unit and the motor drive unit according to the embodiment of the present disclosure.

Embodiments of the present disclosure will now be explained with reference to the accompanying drawings. Referring now to FIG. 1, there is schematically shown a structure of a brake unit 1 that is mounted on a vehicle together with a motor drive unit 2. The brake unit 1 is adapted to control a brake force applied to the vehicle in response to a braking operation executed by a driver.

The brake unit 1 comprises a first brake system 10, a second brake system 20 and a pedal mechanism 30. The first brake system 10 comprises a first sensor 11, a first brake mechanism 12, a first controller 13 and a first power source 14. The second brake system 20 comprises a second sensor 21, a second brake mechanism 22, a second controller 23 and a second power source 24. The pedal mechanism 30 comprises a brake pedal 31, a stroke simulator 32, and an operation rod 33.

The motor drive unit 2 comprises a drive motor 40 as a prime mover that generates a drive torque, and a power transmission mechanism 50 that transmits the drive torque of the drive motor 40 to a driveshaft 3. A drive force is established by delivering the drive torque to a drive wheel (not shown) connected to the driveshaft 3.

As shown in FIG. 1, the first brake mechanism 12 and the second brake mechanism 22 are individually arranged in the motor drive unit 2. The brake unit 1 and the motor drive unit 2 are arranged individually in the front side (Fr) and the rear side (Rr) of the vehicle. Specifically, the brake unit 1 in the front side stops rotations of a driveshaft 3a and a driveshaft 3b connected individually to front wheels, and the motor drive unit 2 in the front side rotates the driveshaft 3a and the driveshaft 3b. Likewise, the brake unit 1 in the rear side stops rotations of a driveshaft 3c and a driveshaft 3d connected individually to rear wheels, and the motor drive unit 2 in the rear side rotates the driveshaft 3c and the driveshaft 3d. Here, one of the brake units 1 in the front side and the rear side may be omitted according to need.

Figure 2:
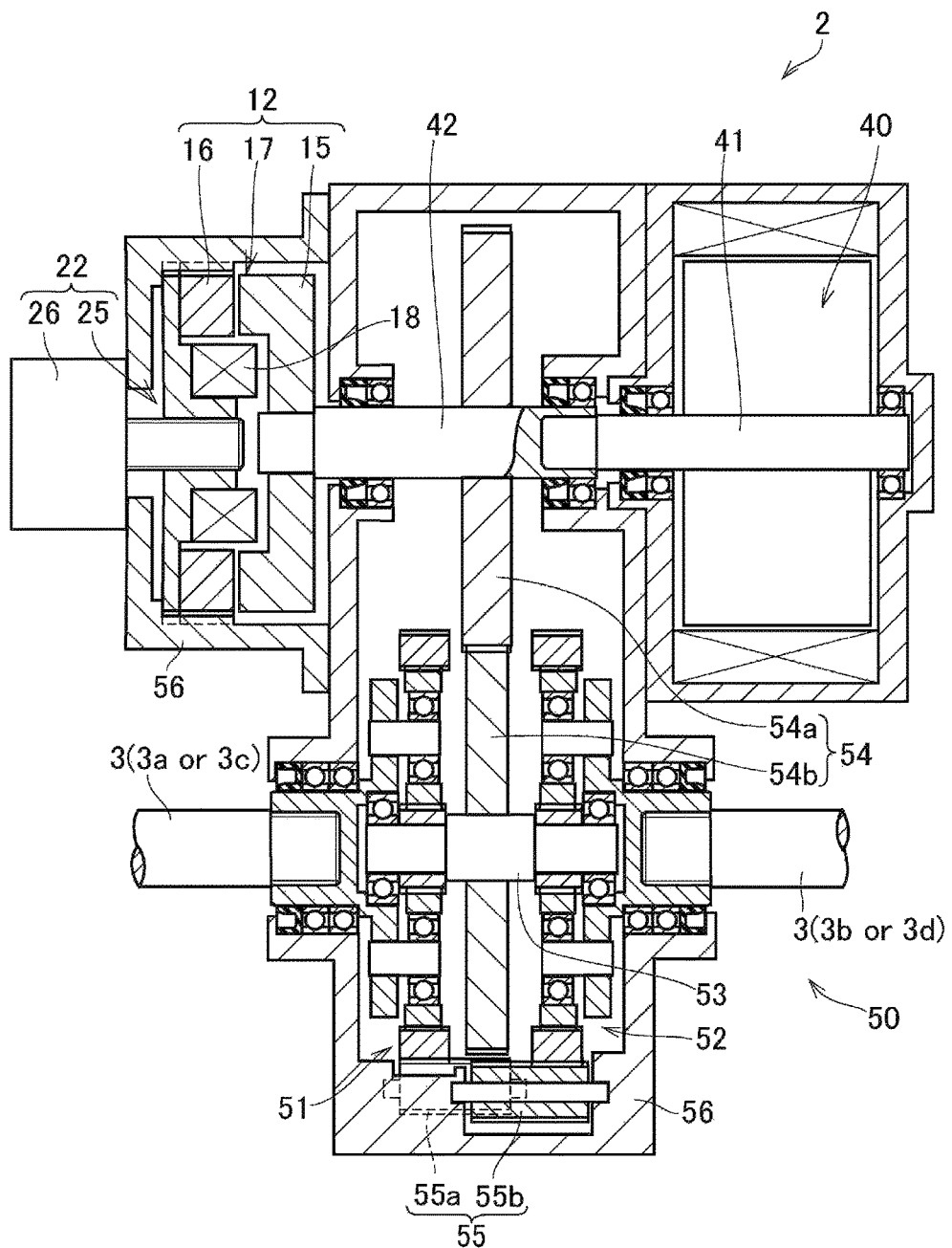
FIG. 2 is a cross-sectional view showing a cross-section of the motor drive unit shown in FIG. 1.

Turning to FIG. 2, there is shown a structure of the brake unit 1 and the motor drive unit 2 in more detail. The motor drive unit 2 comprises a drive motor 40 and the power transmission mechanism 50, and the first brake mechanism 12 and the second brake mechanism 22 of the brake unit 1. Specifically, the drive motor 40 is connected to the power transmission mechanism 50. For example, a permanent magnet synchronous motor and an induction motor may be used as the drive motor 40.

As illustrated in FIG. 2, the power transmission mechanism 50 of the motor drive unit 2 serves as a differential mechanism. To this end, specifically, the power transmission mechanism 50 comprises a first planetary gear unit 51, a second planetary gear unit 52, a connection shaft 53 connecting the first planetary gear unit 51 to the second planetary gear unit 52, a gear pair 54 that transmits torque between the drive motor 40 and the connection shaft 53, and a torque reversing mechanism 55 that transmits torque between the first planetary gear unit 51 and the second planetary gear unit 52 while reversing direction of the torque. Here, structures of the first planetary gear unit 51 and the second planetary gear unit 52 are identical to each other. In the power transmission mechanism 50, a single-pinion planetary gear unit having a sun gear, a ring gear and a carrier is individually used as the first planetary gear unit 51 and the second planetary gear unit 52.

In the first planetary gear unit 51, an output torque of the drive motor 40 is applied to the sun gear through the gear pair 54 and the connection shaft 53. The ring gear of the first planetary gear unit 51 is connected to the ring gear of the second planetary gear unit 52 through the torque reversing mechanism 55, and the carrier of the first planetary gear unit 51 is connected to a driveshaft 3a (or 3c). On an outer circumference of the ring gear of the first planetary gear unit 51, outer teeth are formed to be meshed with a below-mentioned first pinion 55a of the torque reversing mechanism 55.

An output torque of the drive motor 40 is also applied to the sun gear of the second planetary gear unit 52 through the gear pair 54 and the connection shaft 53. The ring gear of the second planetary gear unit 52 is connected to the ring gear of the first planetary gear unit 51 through the torque reversing mechanism 55, and the carrier of the second planetary gear unit 52 is connected to the driveshaft 3b (or 3d). On an outer circumference of the ring gear of the second planetary gear unit 52, outer teeth are also formed to be meshed with a below-mentioned second pinion 55b of the torque reversing mechanism 55.

The connection shaft 53 extends parallel to an output shaft 41 of the drive motor 40 to connect the sun gear of the first planetary gear unit 51 to the sun gear of the second planetary gear unit 52. A driven gear 54b of the gear pair 54 is fitted onto an intermediate portion of the connection shaft 53.

The gear pair 54 comprises a drive gear 54a and a driven gear 54b to form a power transmission route between the output shaft 41 of the drive motor 40 and the each planetary gear unit 51, 52. The drive gear 54a is fitted onto the input shaft 42 that is rotated integrally with the output shaft 41. Accordingly, the output torque of the drive motor 40 is delivered to the connection shaft 53 through the drive gear 54a and the driven gear 54b.

The torque reversing mechanism 55 comprises the first pinion 55a and the second pinion 55b to transmit torque between the ring gears of the first planetary gear unit 51 and the second planetary gear unit 52 while reversing a direction. The first pinion 55a extends parallel to the output shaft 41 and the connection shaft 53, and supported by a casing 56 of the power transmission mechanism 50 in a rotatable manner. According to the example shown in FIG. 2, a left part of the first pinion 55a is meshed with the outer teeth of the ring gear of the first planetary gear unit 51, and a right part of the first pinion 55a is meshed with a left part of the second pinion 55b. Likewise, a right part of the second pinion 55b is meshed with the outer teeth of the ring gear of the second planetary gear unit 52, and the left part of the second pinion 55b is meshed with the right part of the first pinion 55a.

The first brake mechanism 12 is an electromagnetic brake having a brake solenoid 17 including a brake rotor 15 serving as a fixed magnetic pole, and a brake stator 16 serving as a movable magnetic pole. The brake rotor 15 is fitted onto a leading end of the output shaft 41 of the drive motor 40 to be rotated integrally therewith, and the brake stator 16 is engaged with an inner surface of the casing 56 while being allowed to reciprocate in an axial direction but restricted to rotate around the output shaft 41. The brake solenoid 17 further includes a coil 18 that establishes magnetic attraction when energized to bring the brake stator 16 into frictional contact to the brake rotor 15 to generate a brake torque for stopping the rotation of the brake rotor 15. Thus, the first brake mechanism 12 is actuated by an electric energy to apply a frictional brake force to the driveshaft 3 via the output shaft 41 and the input shaft 42 to stop or decelerate the vehicle.

The second brake mechanism 22 is an electric brake that is actuated by energizing the electric motor to stop a rotation of a predetermined rotary member. Moreover, the second brake mechanism 22 is adapted to serve as a parking brake to keep the output shaft 41 stopping by frictionally engaging the brake rotor 15 with the brake stator 16 even if current supply to the first brake mechanism 12 is interrupted. To this end, the second brake mechanism 22 comprises a feed screw mechanism 25 and a brake motor 26 that actuates the feed screw mechanism 25. The feed screw mechanism 25 is adapted to translate a rotary motion of the brake motor 26 into a linear motion thereby pushing the brake stator 16 toward the brake rotor 15 so as to bring the brake stator 16 into frictional contact to the brake rotor 15. Thus, in the second brake mechanism 22, the feed screw mechanism 25 generates a forward thrust force by generating forward torque by the brake motor 26, and the forward thrust force is applied to the brake stator 16. Consequently, the brake stator 16 is frictionally engaged with the brake rotor 15 to halt the output shaft 41. In other words, the second brake mechanism 22 is actuated by utilizing an electric energy to apply the frictional brake force to the driveshaft 3 through the output shaft 41 and the input shaft 42. By contrast, the output shaft 41 is allowed to rotate by generating a reverse torque by the brake motor 26 to withdraw the brake stator 16 from the brake rotor 15. That is, the braking force for stopping the rotation of the output shaft 41 is cancelled.

Specifically, reversed efficiency of the feed screw mechanism 25 of the second brake mechanism 22 to translate the linear motion into the rotational motion is adjusted to be lower than forward efficiency to translate the rotational motion into the linear motion. According to the embodiment, therefore, the output shaft 41 may be halted by pushing the brake stator 16 toward the brake rotor 15 by the feed screw mechanism 25 even if the current supply to the first brake mechanism 12 and the brake motor 26 is stopped. Thus, the feed screw mechanism 25 of the second brake mechanism 22 serves as a thrust force generating mechanism to convert rotary motion into linear motion to generate thrust force, and to keep stopping the rotation of the driveshaft 3.

In addition, the brake torque can be controlled by controlling the second brake mechanism 22 instead of the first brake mechanism 12 by the same manner to control the first brake mechanism 12. That is, the second brake mechanism 22 may be used as a substitution of the first brake mechanism 12.

The motor drive unit 2 thus having the first brake mechanism 12 and the second brake mechanism 22 is mounted on the vehicle to serve as an inboard brake. According to the embodiment, therefore, an unsprung load of the vehicle may be reduced in comparison with that in the conventional vehicle in which the brake device is attached to the wheel. For this reason, ride comfort of the vehicle can be improved.

Figure 3:
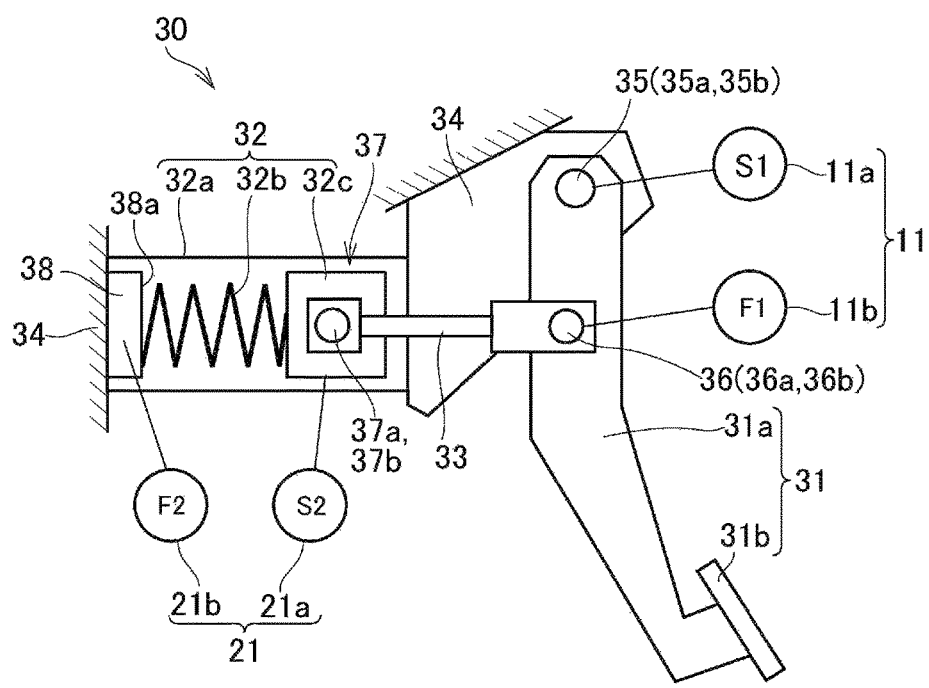
FIG. 3 is an enlarged view showing a pedal mechanism of the brake unit shown in FIG. 1.

Turning to FIG. 3, there is shown a structure of the pedal mechanism 30 in more detail. As described, the pedal mechanism 30 comprises the brake pedal 31, the stroke simulator 32, and the operation rod 33. When the driver depresses the brake pedal 31, the pedal mechanism 30 establishes a reaction force against a pedal force to ensure a suitable brake feel.

The brake pedal 31 comprises a lever 31a, and a pedal pad 31b. The lever 31a hangs from a vehicle body 34 in a pivotal manner, and the pedal pad 31b is attached to a leading end of the lever 31a.

The brake pedal 31 further comprises a pivot point 35 at which the lever 31a is connected to the vehicle body 34, and an output member 36 attached to an intermediate portion of the lever 31a. The pivot point 35 includes a hole 35a formed on an upper end portion of the lever 31a, and a pin 35b inserted into the hole 35a to attach the lever 31a to the vehicle body 34 in a pivotal manner.

The lever 31a is connected to the operation rod 33 through the output member 36 so that a depressing force applied to the pedal pad 31b is transmitted to the operation rod 33. Specifically, the output member 36 comprises a hole 36a penetrating through the output member 36 and one end of the operation rod 33, and a pin 36b inserted into the hole 36a to attach the output member 36 and the operation rod 33 to the lever 31a. Here, the pin 36b is allowed to rotate in the hole 36a.

The stroke simulator 32 serves as a reaction force generating mechanism that generates a reaction force against the pedal force applied to the brake pedal 31 in accordance with a stroke of the brake pedal 31. The stroke simulator 32 comprises a casing 32a, an elastic member 32b, and an additional reaction force generating mechanism 32c. Specifically, the casing 32a is shaped into a cylindrical member, and the elastic member 32b, the additional reaction force generating mechanism 32c, and an after-mentioned input member 37 etc. are held in the casing 32a. In the casing 32a, the elastic member 32b such as a compressed coil spring is elastically compressed by the pedal force to establish the reaction force against the pedal force, and the brake pedal 31 is returned to an original position by the reaction force when the pedal force is eliminated. The additional reaction force generating mechanism 32c is electrically controlled to generate an electro-magnetic or frictional reaction force applied to the brake pedal 31 in addition to the reaction force generated by the elastic member 32b.

The stroke simulator 32 further comprises the input member 37 and a stationary member 38. Other end of the operation rod 33 is connected to the elastic member 32b through the input member 37 so that the pedal force applied to the brake pedal 31 is transmitted to the elastic member 32b. Specifically, the input member 37 is a piston member, and the input member 37 is also held in the casing 32a. A hole 37a is formed to penetrate through the input member 37 and the other end of the operation rod 33, and a pin 37b is inserted into the hole 37a to connect the input member 37 to the operation rod 33. When the pedal force is applied to the brake pedal 31, the input member 37 is pushed by the operation rod 33 in an axial direction while compressing the elastic member 32b (e.g., to the left side in FIG. 3).

The stationary member 38 is attached to a bottom of the casing 32a, and a loading surface 38a of the stationary member 38 receives a reaction force established when the elastic member 32b is compressed. Thus, the stroke simulator 32 is fixed to the vehicle body 34 through the stationary member 38.

That is, one end of the operation rod 33 is coupled to the lever 31a and the other end of the operation rod 33 is coupled to the input member 37, so as to transmit the pedal force applied to the brake pedal 31 to the stroke simulator 32, and to transmit the reaction force established by the stroke simulator 32 against the pedal force to the brake pedal 31. Accordingly, the operation rod 33 serves as a transmission member of the embodiment.

As shown in FIG. 3, the first sensor 11 of the first brake system 10 comprises a first stroke sensor (referred to as "S1" in FIG. 3) 11a as a main sensor functioning in the normal situation, and a first pedal force sensor (referred to as "F1" in FIG. 3) 11b. On the other hand, the second sensor 21 of the second brake system 20 comprises a second stroke sensor (referred to as "S2" in FIG. 3) 21a as a redundant sensor mainly functioning in the event of failure, and a second pedal force sensor (referred to as "F2" in FIG. 3) 21b.

In order to measure a rotational angle of the pin 35b with respect to the hole 35a thereby detecting a stroke (i.e., an operating amount) of the brake pedal 31, the first stroke sensor 11a is arranged in the pivot point 35 of the brake pedal 31. To this end, for example, a potentiometer having a variable resistor, or a rotary encoder may be employed as the first stroke sensor 11a.

In order to measure a load or stress acting between the hole 36a and the pin 36b of the output member 36 thereby detecting the pedal force applied to the brake pedal 31, the first pedal force sensor 11b is arranged in the output member 36. To this end, for example, a strain gauge or a pressure-sensitive diode may be employed as the first pedal force sensor 11b.

In order to measure a displacement of the input member 37 in the casing 32a thereby detecting a stroke of the brake pedal 31 e.g., in the event of failure, the second stroke sensor 21a is arranged in the input member 37. To this end, for example, a potentiometer or a rotary encoder may also be employed as the second stroke sensor 21a.

In order to measure a load or stress acting between the loading surface 38a of the stationary member 38 and the elastic member 32b thereby detecting the pedal force applied to the brake pedal 31, the second pedal force sensor 21b is arranged in the stationary member 38 of the stroke simulator 32. To this end, for example, a strain gauge, a load cell having a strain gauge, or a pressure-sensitive diode may be employed as the second pedal force sensor 21b.

Thus, in the brake unit 1, a stroke of the brake pedal 31 and a pedal force applied to the brake pedal 31 are measured by the first stroke sensor 11a, the first pedal force sensor 11b, the second stroke sensor 21a, and the second pedal force sensor 21b, at different portions of the brake pedal 31 and the stroke simulator 32. As described, the first stroke sensor 11a and the first pedal force sensor 11b are used as the main sensors functioning in the normal condition, and the second stroke sensor 21a and the second pedal force sensor 21b are used as the redundant (or sub) sensors functioning in the event of failure. According to the embodiment, therefore, the brake unit 1 may be controlled properly while maintaining a braking performance without changing a brake feel, even if a failure occurs on any of the sensors.

Figure 4:
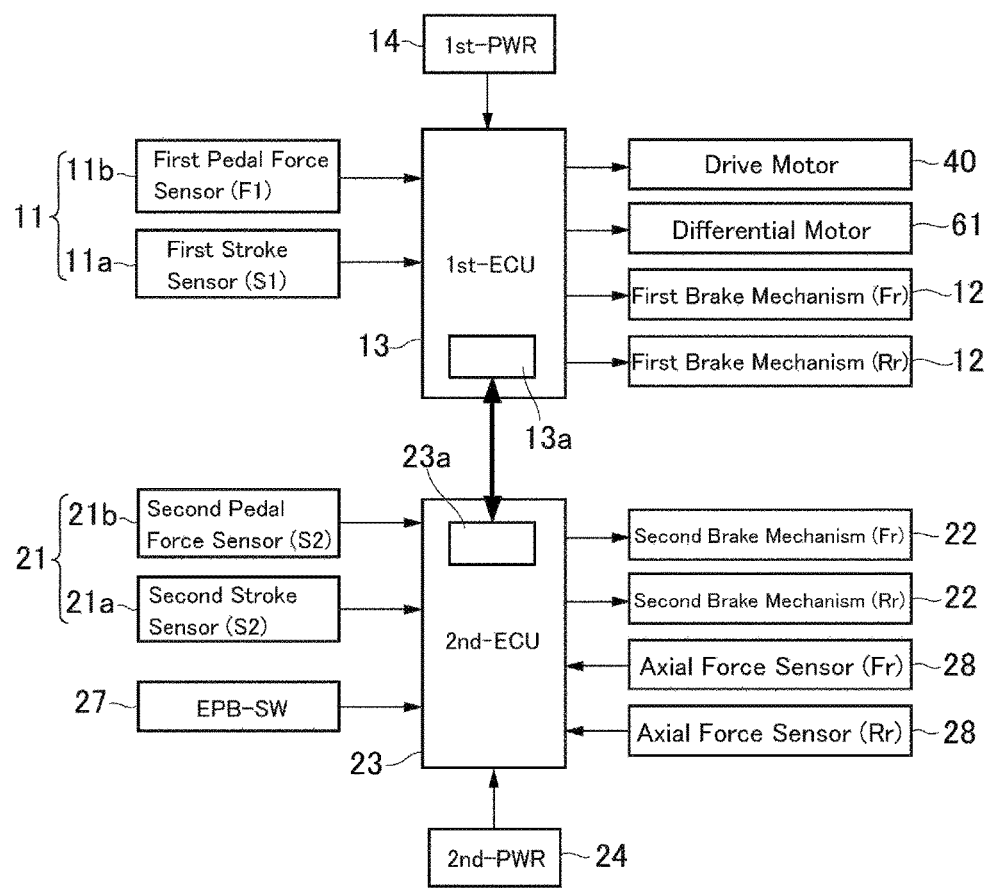
FIG. 4 is a block diagram showing functions of the first ECU and the second ECU.

Turning to FIG. 4, there is shown a control system of the brake unit 1. As shown in FIG. 4, the brake unit 1 comprises a first controller (referred to as "1st-ECU" in FIG. 4) 13 as a main controller functioning in the normal situation, and a second controller (referred to as "2nd-ECU" in FIG. 4) 23 as a redundant (or sub) controller that functions e.g., in the event of failure and in the event of actuating the parking brake. An electronic control unit configured having a microcomputer as its main constituent is individually employed as the first controller 13 and the second controller 23.

The first stroke sensor 11a and the first pedal force sensor 11b are connected to the first controller 13 so that data about the stroke of the brake pedal 31 and the pedal force applied to the brake pedal 31 obtained by the first stroke sensor 11a and the first pedal force sensor 11b is sent to the first controller 13.

Likewise, the second stroke sensor 21a and the second pedal force sensor 21b are connected to the second controller 23 so that data about the stroke of the brake pedal 31 and the pedal force applied to the brake pedal 31 obtained by the second stroke sensor 21a and the second pedal force sensor 21b is sent to the second controller 23. In addition, an ON-OFF signal from a parking brake switch (referred to as "EPB-SW" in FIG. 4) 27 is also sent to the second controller 23. Specifically, the parking brake switch 27 is turned on when the second brake mechanism 22 is actuated as a parking brake. Further, an axial force sensor 28 that detects an axial force established by the feed screw mechanism 25 of the second brake mechanism 22 is also connected to the second controller 23 so that data about the axial force of the feed screw mechanism 25 is sent to the second controller 23.

In order to control the brake solenoid 17 of the first brake mechanism 12 and the drive motor 40 of the motor drive unit 2, the first controller 13 carries out calculations based on the incident data as well as formulas and maps installed in advance. Calculation results are transmitted from the first controller 13 to the first brake mechanism 12 and the drive motor 40 in the form of command signals. In addition, the first controller 13 also controls an after-mentioned differential motor 61 and a limited slip differential 66 of a motor drive unit 4 that performs a torque vectoring.

In order to control the brake motor 26 of the second brake mechanism 22 the second controller 23 carries out calculations based on the incident data as well as formulas and maps installed in advance, and a calculation result is transmitted to second brake mechanism 22 in the form of command signal. In addition, the second controller 23 controls the second brake mechanism 22 based also on the ON-OFF signal from the parking brake switch 27.

The first controller 13 is also connected to a first power source (referred to as "1st-PVR" in FIG. 4) 14 so that electricity is supplied from the first power source 14 to the first controller 13 and the first brake mechanism 12. Likewise, the second controller 23 is also connected to a second power source (referred to as "2nd-PWR" in FIG. 4) 24 so that electricity is supplied from the second power source 24 to the second controller 23 and the second brake mechanism 22.

In addition, the first controller 13 and the second controller 23 are connected to each other in a communicatable manner so that the first controller 13 and the second controller 23 support each other.

Specifically, the first controller 13 comprises a first communication device 13a that transmits and receives a signal to/from the second controller 23, and the second controller 23 also comprises a second communication device 23a that transmits and receives a signal to/from the first controller 13. That is, the first communication device 13a and the second communication device 23a are electrically connected to each other to provide a communication between the first controller 13 and the second controller 23. Thus, the first controller 13 and the second controller 23 are allowed to support each other to control the brake force established by at least one of the first brake mechanism 12 and the second brake mechanism 22.

For example, in the event of failure of the second controller 23, an actuation of the second brake mechanism 22 can be controlled by the first controller 13. Contrarily, in the event of failure of the first controller 13, the second controller 23 may be used as a backup of the first controller 13 to control an actuation of the first brake mechanism 12. Moreover, in the event of failure of any of components of the first brake system 10, the first brake system 10 is allowed to function properly by controlling a counterpart of the faulty component in the second brake system 20 by the first controller 13 and the second controller 23. Contrarily, in the event of failure of any of components of the second brake system 20, the second brake system 20 is allowed to function properly by controlling a counterpart of the faulty component in the first brake system 10 by the first controller 13 and the second controller 23.

Figure 5:
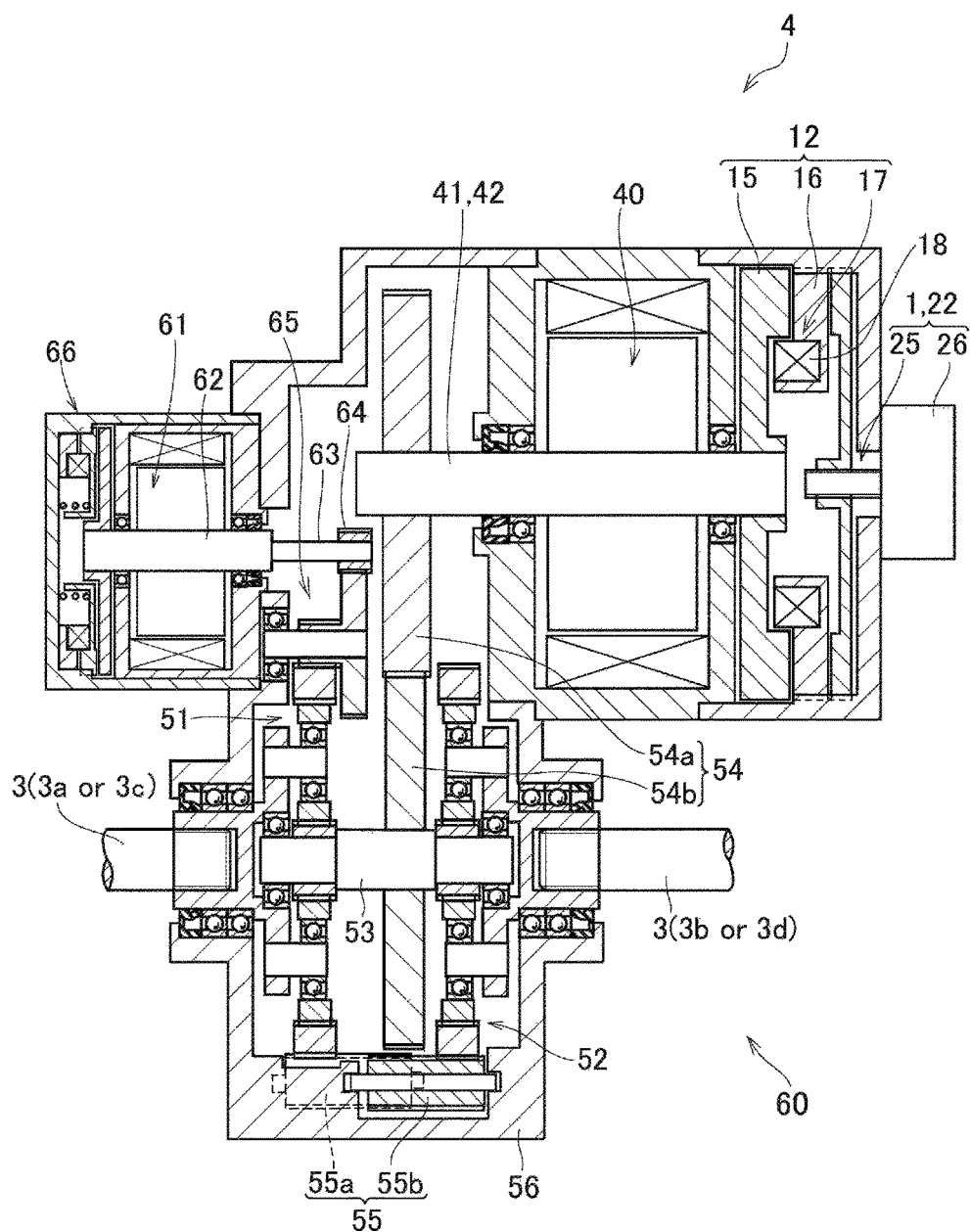
FIG. 5 is a cross-sectional view showing a cross-section of the motor drive unit according to a second example.
Figure 6:
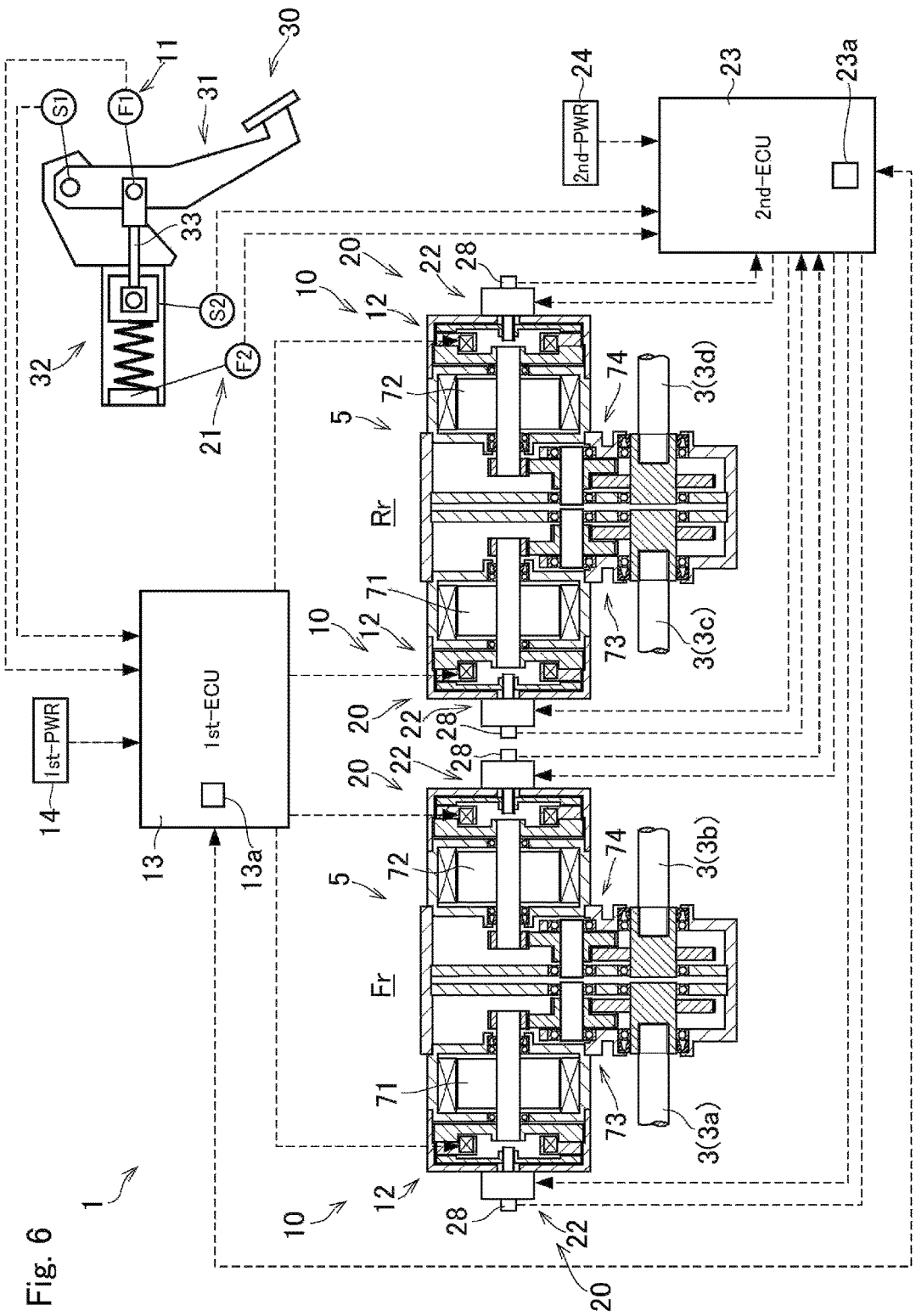
FIG. 6 is a schematic illustration showing a structure of the brake unit and the motor drive unit according to a third example.

Hereinafter, other examples of the motor drive unit will be explained with reference to FIGS. 5, 6, and 7. FIG. 5 shows a second example of the motor drive unit. The motor drive unit 4 shown in FIG. 5 comprises a drive motor 40, and a power transmission mechanism 60 as a differential mechanism adapted to perform a torque vectoring. Specifically, the power transmission mechanism 60 further comprises a differential motor 61 in addition to the constitutional elements of the power transmission mechanism 50 shown in FIG. 1. In FIGS. 5 to 7, common reference numeral are allotted to the elements in common with those in the foregoing drawings, and detailed explanations for the common elements will be omitted in the following explanation.

The differential motor 61 is an electric motor adapted to apply a differential torque to any of the rotary elements of the differential mechanism formed by the first planetary gear unit 51 and the second planetary gear unit 52 thereby altering a torque split ratio from the drive motor 40 to the driveshaft 3a (or 3c) and the driveshaft 3b (or 3d). In the motor drive unit 4 shown in FIG. 5, a pinion 64 is fitted onto a leading end of an output shaft 63 integrated with a rotary shaft 62 of the differential motor 61 while connected to the outer teeth of the ring gear of the first planetary gear unit 51 through a counter gear 65. In the motor drive unit 4, therefore, the torque delivered from the drive motor 40 to one of the driveshaft 3a (or 3c) and the driveshaft 3b (or 3d) is increased and the torque delivered from the drive motor 40 to the other one of the driveshaft 3a (or 3c) and the driveshaft 3b (or 3d) is decreased by applying the differential torque of the differential motor 61 to the ring gear of the first planetary gear unit 51.

The motor drive unit 4 further comprises a limited slip differential 66. The limited slip differential 66 is adapted to limit differential rotation between the driveshaft 3a (or 3c) and the driveshaft 3b (or 3d) by applying a frictional braking force as a differential limit torque to any of the rotary elements of the differential mechanism formed by the first planetary gear unit 51 and the second planetary gear unit 52. Specifically, the limited slip differential 66 is an electromagnetic clutch that establishes a brake torque utilizing a spring force when it is not energized, and the brake torque is reduced by energizing the limited slip differential 66.

FIG. 6 shows a third example of the motor drive unit. The motor drive unit 5 shown in FIG. 6 comprises a pair of drive motors 71 and 72, and a pair of power transmission mechanism 73 and 74. The drive motors 71 and 72 are arranged to be opposed to each other across the motor drive unit 5. In the motor drive unit 5, a drive torque generated by the left drive motor 71 is delivered to the driveshaft 3a through the power transmission mechanism 73, and a drive torque generated by the right drive motor 72 is delivered to the driveshaft 3b through the power transmission mechanism 74. Each of the power transmission mechanism 73 and 74 is individually adapted to serve as a speed reducing device so that the drive torques generated by the drive motors 71 and 72 are delivered to the driveshafts 3a and 3b while being multiplied.

The electromagnetic brakes of the first brake mechanism 12 are disposed on each rotary shaft of the drive motors 71 and 72, and the rotary shafts of the drive motors 71 and 72 are also halted by the second brake mechanism 22. That is, two first brake mechanism 12 and two second brake mechanism 22 are arranged in the motor drive unit 5 shown in FIG. 6. In addition, two axial force sensors 28 are also arranged in the motor drive unit 5 to detect the axial forces of the second brake mechanisms 22.

FIG. 7 shows a third example of the motor drive unit. The motor drive unit 6 shown in FIG. 7 comprises a pair of drive motors 81, 82, a pair of power transmission mechanism 83 and 84, and a clutch device 85. The drive motors 81 and 82 are arranged to be opposed to each other across the motor drive unit 6. In the motor drive unit 6, a drive torque generated by the left drive motor 81 is delivered to the driveshaft 3a through the power transmission mechanism 83, and a drive torque generated by the right drive motor 82 is delivered to the driveshaft 3b through the power transmission mechanism 84. Each of the power transmission mechanism 83 and 84 is individually adapted to serve as a speed reducing device so that the drive torques generated by the drive motors 81 and 82 are delivered to the driveshafts 3a and 3b while being multiplied.

The clutch device 85 is disposed between the left drive motor 81 and the right drive motor 82 to selectively connect rotary shafts of the left drive motor 81 and the right drive motor 82. In the motor drive unit 6, an electromagnetic clutch is used as the clutch device 85 that is normally released, and the clutch device 85 is engaged to connect rotary shafts of the motors 81 and 82 when energized. That is, the clutch device 85 serves as a limited slip differential to restrict a differential rotation between the driveshaft 3a (or 3c) and the driveshaft 3b (or 3d).

The electromagnetic brakes of the first brake mechanism 12 are disposed on each of the rotary shafts of the drive motors 81 and 82. In the motor drive unit 6 shown in FIG. 7, the second brake mechanism 22 stops the rotation of the rotary shaft of the right drive motor 82. In order to detect the axial force of the second brake mechanisms 22, the second brake mechanisms 22 is also provided with the axial force sensor 28.

The applicant of the present disclosure have disclosed the "Drive Unit" having two drive motors and two transmission units for distributing torques of the drive motors to both wheels, in JP-A-2016-091683 and JP-A-2016-091684. Accordingly, detailed explanations for the motor drive units 5 and 6 shown in FIGS. 6 and 7 are omitted.

Although the above exemplary embodiments of the present application have been described, it will be understood by those skilled in the art that the present application should not be limited to the described exemplary embodiments, and various changes and modifications can be made within the spirit and scope of the present disclosure.

What is claimed is:

1. A brake unit, that is mounted on a vehicle together with a motor drive unit including a drive motor that generates a drive torque to establish a drive force of the vehicle and a power transmission mechanism that delivers the drive torque to a driveshaft, and that controls a brake force applied to the vehicle in accordance with a stroke of a brake pedal and a pedal force applied to the brake pedal, comprising:
a first brake system comprising: a first sensor that detects a stroke of the brake pedal and the pedal force applied to the brake pedal; a first brake mechanism that is actuated by an electric energy to apply a frictional brake force to the driveshaft; a first controller that controls the first brake mechanism based on the stroke and the pedal force detected by the first sensor; and a first power source that supplies electricity to the first brake mechanism and the first controller; and
a second brake system comprising: a second sensor that detects a stroke of the brake pedal and the pedal force applied to the brake pedal; a second brake mechanism that is actuated by an electric energy to apply a frictional brake force to the driveshaft; a second controller that controls the second brake mechanism based on the stroke and the pedal force detected by the second sensor; and a second power source that supplies electricity to the second brake mechanism and the second controller, wherein the first controller comprises a first communication device that transmits and receives a signal to/from the other controller,
the second controller comprises a second communication device that transmits and receives a signal to/from the other controller,
the first communication device and the second communication device are connected to each other, and
the first controller and the second controller support each other to control the brake force.

2. The brake unit as claimed in claim 1,
wherein the first brake mechanism includes an electromagnetic brake that is actuated to establish magnetic attraction when energized, and
the second brake mechanism includes an electric brake that is actuated by an output torque of a brake motor that is energized to generate the torque.

3. The brake unit as claimed in claim 2,
wherein the second brake mechanism comprises a thrust force generating mechanism that converts rotary motion into linear motion to generate a thrust force to halt the driveshaft and that keeps stopping a rotation of the driveshaft,
the thrust force generating mechanism is actuated by the output torque of the brake motor to apply the frictional brake force to the driveshaft, and
the second brake system serves as a parking brake that keeps the driveshaft stopping after halting any one of pairs of the driveshafts connected to front wheels or rear wheels and stopping current supply to the second brake mechanism.

4. The brake unit as claimed in claim 1, wherein the first brake mechanism and the second brake mechanism are mounted on the vehicle to individually serve as an inboard brake to halt each pair of the front wheels and the rear wheels.

5. The brake unit as claimed in claim 1, further comprising:
a reaction force generating mechanism that generates a reaction force against the pedal force applied to the brake pedal in accordance with a stroke of the brake pedal; and
a transmission member that transmits the pedal force between the brake pedal and the reaction force generating mechanism,
wherein the brake pedal comprises a pivot point at which the brake pedal is connected to a vehicle body in a pivotal manner, and an output member that transmits the pedal force applied to the brake pedal to the transmission member,
the reaction force generating mechanism comprises an elastic member that is elastically compressed by the pedal force, an input member that transmits the pedal force transmitted from the transmission member to the elastic member, and a stationary member that receives a reaction force established when the elastic member is compressed,
the first sensor comprises a first stroke sensor that is arranged in the pivot point to detect the stroke of the brake pedal, and a first pedal force sensor that is arranged in the output member to detect the pedal force applied to the brake pedal,
the second sensor comprises a second stroke sensor that is arranged in the input member to detect the stroke of the brake pedal, and a second pedal force sensor that is arranged in the stationary member to detect the pedal force applied to the brake pedal, the first brake system is adapted to control the brake force based on the stroke detected by the first stroke sensor and the pedal force detected by the first pedal force sensor, and the second brake system is adapted to control the brake force based on the stroke detected by the second stroke sensor and the pedal force detected by the second pedal force sensor.

6. The brake unit as claimed in claim 1, wherein in the event of failure of the first brake system, the second brake system controls the brake force, or a counterpart of a faulty component in the second brake system functions instead of a faulty component of the first brake system to control the brake force.

* * * * *